(12) United States Patent
Shin

(10) Patent No.: US 8,883,910 B2
(45) Date of Patent: Nov. 11, 2014

(54) RESIN COMPOSITION FOR COATING AND MOLDED RESIN PRODUCT OBTAINED THEREFROM

(75) Inventor: Yong-Woo Shin, Gyeongsangnam-do (KR)

(73) Assignee: Lotte Chemical Corporation, Seoul (KR)

( * ) Notice: Subject to any disclaimer, the term of this patent is extended or adjusted under 35 U.S.C. 154(b) by 136 days.

(21) Appl. No.: 13/500,397

(22) PCT Filed: Sep. 15, 2010

(86) PCT No.: PCT/KR2010/006288
§ 371 (c)(1), (2), (4) Date: Jul. 6, 2012

(87) PCT Pub. No.: WO2011/043547
PCT Pub. Date: Apr. 14, 2011

(65) Prior Publication Data
US 2012/0270993 A1    Oct. 25, 2012

(30) Foreign Application Priority Data
Oct. 9, 2009   (KR) ..................... 10-2009-0096428

(51) Int. Cl.
C09D 123/26 (2006.01)
C09D 123/10 (2006.01)
C08L 23/14 (2006.01)

(52) U.S. Cl.
CPC .............. *C09D 123/10* (2013.01); *C08L 23/14* (2013.01); *C08L 2205/02* (2013.01); *C08L 2205/03* (2013.01)
USPC ....................................................... 524/528

(58) Field of Classification Search
None
See application file for complete search history.

(56) References Cited

U.S. PATENT DOCUMENTS 5,032,459 A    7/1991  Toyoshima et al.

FOREIGN PATENT DOCUMENTS

| JP | 11-166084 A | 6/1999 |
|---|---|---|
| JP | 2003-041074 A | 2/2003 |
| JP | 2004-107538 A | 4/2004 |
| KR | 96-0008818 B1 | 7/1996 |

OTHER PUBLICATIONS

Machine translation of JP 2003-041074 (original provided by Applicant).*
International Search Report for Application No. PCT/KR2010/006288 dated Jun. 27, 2011.

* cited by examiner

*Primary Examiner* — Ling Choi
*Assistant Examiner* — Catherine S Branch
(74) *Attorney, Agent, or Firm* — Alston & Bird LLP

(57) ABSTRACT

Provided is a resin composition for coating, including: 35-65 wt % of a high-molecular weight polypropylene resin (A) having a weight average molecular weight of 100,000-300,000 and an isotactic chain molar fraction, L, of 0.30-0.70; 30-60 wt % of a low-molecular weight polypropylene resin (B) having a weight average molecular weight of 10,000-50,000 and an isotactic chain molar fraction, L, of 0.30-0.70; and 0.1-5.0 wt % of a highly crystalline, low-molecular weight polypropylene resin (C) having a weight average molecular weight of 5,000-50,000 and an isotactic chain molar fraction, L, of 0.70-0.75. The polypropylene resin composition for coating is amenable to spray coating while avoiding a need for a complicated process such as discharge treatment, flame treatment or acid treatment of a polypropylene substrate, in the absence of chlorine, and is effective for forming a coating film having excellent scratch resistance and adhesive property and showing no tagging property.

20 Claims, No Drawings

RESIN COMPOSITION FOR COATING AND MOLDED RESIN PRODUCT OBTAINED THEREFROM

CROSS-REFERENCE TO RELATED APPLICATION

This application is a national stage application filed under 35 U.S.C. 371 of international Application No. PCT/KR2010/006288, filed Sep. 15, 2010, which claims priority from Korean Application No. 10-2009-0096428, filed Oct. 9, 2009, each of which is incorporated by reference herein in its entirety.

TECHNICAL FIELD

The present disclosure relates to a polypropylene resin composition for coating and a molded resin product obtained therefrom, and more particularly, to a polypropylene resin composition for coating, a coating agent prepared from the resin composition, a laminate formed from the coating agent, and a molded resin product obtained from the composition.

BACKGROUND ART

Polypropylene resins are inexpensive and have good moldability, chemical resistance, processability, water resistance and thermal properties. Thus, they have been used as universal resins for sheets or films, car interior/exterior materials, various molded bodies, or the like.

However, since polypropylene resins have high crystallinity and low surface energy and are non-polar, they have little affinity with polar resins or coating, such as acrylic resins, urethane resins or vinyl acetate resins. As a result, there is a problem in that polypropylene resins are not amenable to coating, adhesion or printing using heterogeneous resins or coating.

There have been suggested some methods to solve such a problem. Particularly, the followings are used for carrying out coating: (1) modification of substrates: introduction of polar groups to a substrate surface using pretreatment methods such as discharge treatment, flame treatment or acid treatment, (2) use of a chlorinated resin: introducing chlorine to a polypropylene resin having a structure similar to the structure of a substrate or having high compatibility with a substrate to impart solubility and polarity, (3) use of low-molecular weight rubbery polypropylene: grafting an unsaturated carboxylic acid such as maleic acid, fumaric acid, itaconic acid or citraconic acid to a low-molecular weight soluble polypropylene resin having a structure similar to the structure of a substrate or having high compatibility with a substrate to obtain an acid-modified resin provided with polarity. In fact, use of method (1) alone shows insufficient adhesion, and thus methods (2) and (3) are frequently used in combination.

However, method (1) includes a complicated pretreatment process and causes the problems of overspend of equipment and energy and a drop in productivity. The chlorinated resin of method (2) is a high-rigidity polypropylene resin having an isotactic chain molar fraction, L, of about 1 and containing chlorine introduced thereto in order to impart polarity and solubility. Although such a chlorinated resin has been used for a long time since 1960's, there are problems in that the presence of chlorine adversely affects the users, workers and environment, deteriorates thermal stability or weather resistance of coated products, and the coated products generate environmental hormones upon discarding.

In addition, method (3) is technology free from the use of chlorine in method (2), and thus has an advantage of lack of chlorine. However, it causes additional problems in that a rubbery low-molecular weight polyolefin resin deteriorates scratch resistance and adhesion, and impurities may be attached to coated products due to the generation of tagging. Further, use of a highly crystalline resin or high-molecular weight resin for improving scratch resistance and tagging property causes degradation of coating stability and spraying property and delays in crystallization rate, resulting in surface roughening of coated bodies and generation of dust that may cause occlusion in a spraying unit. As a method for preventing tagging, an organic/inorganic nucleating agent may be used, but such a nucleating agent makes the overall process complicated, decreases transparency of the resultant coating film and causes surface precipitation.

Therefore, there has been a need in the art for a resin composition that contains no chlorine or nucleating agent, has improved scratch resistance and adhesive property, causes no tagging, and is amenable to coating using a spraying unit.

DISCLOSURE

Technical Problem

The present disclosure is directed to providing a polypropylene resin composition for coating, which has high adhesion to a non-polar substrate, such as a polyolefin resin substrate, particularly a polypropylene substrate, and good scratch resistance and spraying property, and shows low tagging property and high crystallization rate on a coated surface. The present disclosure is also directed to providing a molded resin product obtained from the resin composition.

Technical Solution

In one general aspect, the present disclosure provides a resin composition for coating, including:

35-65 wt % of a high-molecular weight polypropylene resin (A) having a weight average molecular weight of 100,000-300,000 and an isotactic chain molar fraction, L, as defined in the following Mathematical Formula 1, of 0.30-0.70;

30-60 wt % of a low-molecular weight polypropylene resin (B) having a weight average molecular weight of 10,000-50,000 and an isotactic chain molar fraction, L, as defined in the following Mathematical Formula 1, of 0.30-0.70; and 0.1-5.0 wt % of a highly crystalline, low-molecular weight polypropylene resin (C) having a weight average molecular weight of 5,000-50,000 and an isotactic chain molar fraction, L, as defined in the following Mathematical Formula 1, of 0.70-0.75.

$$\frac{1}{T_m} - \frac{1}{T_m^0} = -\frac{R}{\Delta H_U} \ln L \qquad \text{[Mathematical Formula 1]}$$

wherein $T_m$ is melting point of a resin, $T_m^0$ is melting point of a perfect crystal, R is the gas constant, $\Delta H_u$ is melting enthalpy per mol of crystallizable units, and L is an isotactic chain molar fraction.

In another aspect, there is provided a coated molded product obtained by using the resin composition for coating.

In still another aspect, there is provided a polypropylene resin having a weight average molecular weight of 100,000-

300,000 and an isotactic chain molar fraction, L, as defined in the following Mathematical Formula 1, of 0.30-0.70.

$$\frac{1}{T_m} - \frac{1}{T_m^0} = -\frac{R}{\Delta H_U} \ln L \qquad \text{[Mathematical Formula 1]}$$

wherein $T_m$ is melting point of a resin, $T_m^0$ is melting point of a perfect crystal, R is the gas constant, $\Delta H_u$ is melting enthalpy per mol of crystallizable units, and L is an isotactic chain molar fraction.

In still another aspect, there is provided a polypropylene resin having a weight average molecular weight of 10,000-50,000 and an isotactic chain molar fraction, L, as defined in the following Mathematical Formula 1, of 0.30-0.70.

$$\frac{1}{T_m} - \frac{1}{T_m^0} = -\frac{R}{\Delta H_U} \ln L \qquad \text{[Mathematical Formula 1]}$$

wherein $T_m$ is melting point of a resin, $T_m^0$ is melting point of a perfect crystal, R is the gas constant, $\Delta H_u$ is melting enthalpy per mol of crystallizable units, and L is an isotactic chain molar fraction.

In yet another aspect, there is provided a polypropylene resin having a weight average molecular weight of 5,000-50,000 and an isotactic chain molar fraction, L, as defined in the following Mathematical Formula 1, of 0.70-0.75.

$$\frac{1}{T_m} - \frac{1}{T_m^0} = -\frac{R}{\Delta H_U} \ln L \qquad \text{[Mathematical Formula 1]}$$

wherein $T_m$ is melting point of a resin, $T_m^0$ is melting point of a perfect crystal, R is the gas constant, $\Delta H_u$ is melting enthalpy per mol of crystallizable units, and L is an isotactic chain molar fraction.

Advantageous Effects

The polypropylene resin composition for coating according to the present disclosure is applicable to spray coating in the absence of chlorine while avoiding a need for a complicated process, such as discharge treatment, flame treatment or acid treatment of a polypropylene substrate. In addition, the polypropylene resin composition for coating according to the present disclosure has excellent scratch resistance and adhesive property and shows no tagging property.

BEST MODE

Hereinafter, the embodiments of the present disclosure will be described in detail.

In general, a coating material using a polypropylene resin is characterized by a catalyst for preparing olefin, number of heterogeneous bonding using the characteristics of the catalyst, terminal state of the primary structure of the resin, melt flow rate (MFR), mesopentad fraction [mmmm] representing the crystallinity of the primary structure, dissolution degree during solvent extraction of the resin, molecular weight distribution, copolymerization degree with a heterogeneous monomer, copolymerization with other polar resins, physical properties, or the like. However, such factors do not indicate the characteristics of the polypropylene resin for coating, which is an essential ingredient for adhesion to a polypropylene resin as a substrate. The mesopentad fraction [mmmm] has been used frequently as a measure indicating crystallinity or coatability and other physical properties of polypropylene.

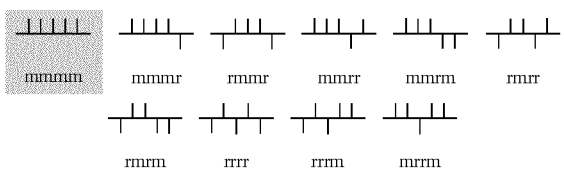

The pentad fraction of a polypropylene resin is the percentage of $^{13}$C-NMR spectrum varying with the position of the five adjacent methyl groups, and the mesopentad fraction [mmmm] is used as a measure indicating the crystallinity of a resin. A relatively high mesopentad fraction [mmmm] means high crystallinity leading to an increase in adhesion to a substrate but a decrease in flowability. On the other hand, a relatively low mesopentad fraction [mmmm] means low crystallinity leading to generation of tagging and an increase in flowability but a decrease in adhesion. However, such a mesopentad fraction [mmmm] is not an absolute measure indicating the crystallinity of a polypropylene resin.

Collette and coworkers have disclosed that at least 14-18 isotactic monomer chains are required for polypropylene to have crystallinity (*Macromocules*, Vol. 22, No. 10, 1989). Therefore, isotactic monomer chain fraction [mmmm] is used as a parameter from which the stereoregularity of a polymer is estimated, but is imperfect as an indicator of crystallinity. This is because no matter how many five isotactic (represented by an isotactic monomer chain fraction [mmmm]) may be, they have no crystallinity, show poor compatibility with a polypropylene substrate and may not form cocrystals with ease, unless they are continuous. A highly crystalline resin having a mesopentad fraction of 90% or more has a low deviation in crystallinity but a lower mesopentad fraction leads to a larger deviation in a proportional relationship. Therefore, mesopentad fraction is not suitable for designing a polypropylene resin for coating.

In the case of a polypropylene resin for coating, a mesopentad fraction [mmmm] obtained from $^{13}$C-NMR has been used frequently as a measure for solubility or other properties of the resin. If necessary, the number of heterogeneous bonding resulting from the characteristics of a catalyst for propylene polymerization may be used as a measure. However, the heterogeneous bonding number is not suitable as a measure for designing a coating material.

Mathematical Formula 1 is one modified from the formula of freezing point depression and L represents the molar fraction of solvent in a general solution. Isotactic polypropylene is a semi-crystalline resin and has a crystalline segment (isotactic) and a non-crystalline segment (atactic) in combination. It is thought that an isotactic polypropylene resin includes a crystalline isotactic chain incorporated into a non-crystalline atactic chain. In the case of a polypropylene resin, it is thought that the polymer chain structure has such crystallinity that a heterogeneous monomer segment is atactic and a polypropylene chain segment is isotactic.

When regarding an atactic chain of a stereoblock polypropylene or polypropylene resin as a solute and an isotactic chain as a solvent, the molar fraction of solvent at the melting point of a sample in which crystals are dissolved completely indicates the molar fraction of isotactic chains of the stereoblock polypropylene or resin. Therefore, when L=1.0, the polypropylene is a complete isotactic polypropylene. In addition, as L approaches 1.0, there is provided a stereoblock polypropylene containing a large amount of highly crystalline isotactic chains. As L approaches 0, there is provided a nearly rubbery polypropylene resin. Herein, L in the formula is also called 'isotactic chain molar fraction'. Herein, L value, i.e., isotactic chain molar fraction represents the value before each polymerized polypropylene resin is acid-modified (e.g. maleic anhydride-modified).

According to an embodiment, the coating agent obtained by acid modification of a high-molecular weight polypropylene resin (A) having an isotactic chain molar fraction, L, of 0.30-0.70, a low-molecular weight polypropylene resin (B) having an isotactic chain molar fraction, L, of 0.30-0.70, and a highly crystalline, low-molecular weight polypropylene resin (C) having an isotactic chain molar fraction, L, of 0.70-0.75, shows higher coatability as compared to chlorinated resins coating according to the related art.

In one aspect, there is provided a resin composition for coating, including:

35-65 wt % of a high-molecular weight polypropylene resin (A) having a weight average molecular weight of 100,000-300,000 and an isotactic chain molar fraction, L, as defined in the following Mathematical Formula 1, of 0.30-0.70;

30-60 wt % of a low-molecular weight polypropylene resin (B) having a weight average molecular weight of 10,000-50,000 and an isotactic chain molar fraction, L, as defined in the following Mathematical Formula 1, of 0.30-0.70; and 0.1-5.0 wt % of a highly crystalline, low-molecular weight polypropylene resin (C) having a weight average molecular weight of 5,000-50,000 and an isotactic chain molar fraction, L, as defined in the following Mathematical Formula 1, of 0.70-0.75.

$$\frac{1}{T_m} - \frac{1}{T_m^0} = -\frac{R}{\Delta H_U} \ln L$$ [Mathematical Formula 1]

wherein $T_m$ is melting point of a resin, $T_m^0$ is melting point of a perfect crystal, R is the gas constant, $\Delta H_u$ is melting enthalpy per mol of crystallizable units, and L is an isotactic chain molar fraction.

Hereinafter, resins (A), (B) and (C) forming the resin composition for coating will be explained in detail.

High-molecular weight resin (A) preferably has a weight average molecular weight of 100,000-300,000. A weight average molecular weight less than 100,000 causes low adhesion or tagging. On the other hand, a weight average molecular weight higher than 300,000 causes degradation of coating stability or spraying property, resulting in a non-uniform coating film.

High-molecular weight resin (A) is preferably used in an amount of 35-65 wt %. A content of resin (A) less than 35 wt % causes degradation of adhesive property, scratch resistance or cohesive property. On the other hand, a content of resin (A) higher than 65 wt % causes degradation of spraying property or coating stability. Herein, the content means the proportion of polymerized resin (A) present in the composition after the acid modification. This also applies to the following description.

Low-molecular weight resin (B) preferably has a weight average molecular weight of 10,000-50,000. A weight average molecular weight less than 10,000 causes improvement in coating stability but results in tagging and poor heat resistance of a coating film. On the other hand, a weight average molecular weight higher than 50,000 means an increase in content of resin component (A), and causes degradation of flowability and spraying property of coating, leading to a non-uniform coating film. When resin (B) has a low melt flow rate, it causes tagging or poor adhesion. On the other hand, when resin (B) has a high melt flow rate, it causes degradation of spraying property, thereby making it difficult to form a uniformly coated body.

Low-molecular weight resin (B) is preferably used in an amount of 30-60 wt %. A content of low-molecular weight resin (B) less than 30 wt % causes degradation of coating stability and spraying property. On the other hand, a content of low-molecular weight resin (B) higher than 60 wt % causes improvement in coating stability or spraying property but results in tagging and poor heat resistance or adhesion of a coated body.

Low-molecular weight highly crystalline resin (C) is preferably used in an amount of 0.1-5.0 wt %. A content of low-molecular weight highly crystalline resin (C) less than 0.1 wt % causes a drop in crystallization rate of a coating film after coating, and thus even under small stress after coating, the coating film causes interlayer separation and degradation of scratch resistance. On the other hand, a content of low-molecular weight highly crystalline resin (C) higher than 5.0 wt % causes degradation of coating stability and generation of defects.

Low-molecular weight highly crystalline resin (C) preferably has a weight average molecular weight of 5,000-50,000. A weight average molecular weight less than 5,000 prevents resin (C) from realizing physical properties sufficient as a crystallizing agent. A weight average molecular weight higher than 50,000 causes poor dissolution, defect generation and degradation of coating stability.

High-molecular weight polypropylene (A) and low-molecular weight polypropylene (B) used in the polypropylene resin composition according to the present disclosure preferably include structural units derived from general propylene alone. However, polypropylene (A) and polypropylene (B) may contain less than 20 mol % of structural units derived from heterogeneous monomers. When such heterogeneous monomers are used in an amount of 20 mol % or more, they may cause degradation of adhesion to a polypropylene substrate, or defect generation or degradation of stability due to the presence of each HOMO resin.

Highly crystalline polypropylene resin (C) preferably includes structural units derived from propylene alone. However, polypropylene resin (C) may include less than 5 mol % of structural units derived from a heterogeneous monomer. When such heterogeneous monomers are used in an amount of 5 mol % or more, the resultant coated surface may show tagging due to a decreased surface crystallization rate or cause degradation of adhesion right after the coating due to a drop in crystallization rate of a coating film.

Particular examples of the heterogeneous monomers include α-olefins such as ethylene, 1-butene, 1-pentene, 1-hexene, 1-methyl-1-pentene, 4-methyl-1-pentene, 1-heptene, 1-octene, 1-nonene, 1-decene, 1-dodecene, etc., (meth) acrylates such as methyl (meth)acrylate, ethyl (meth)acrylate, butyl (meth)acrylate, etc., maleates such as dimethyl maleate, diethyl maleate, dibutyl maleate, etc., (meth)acrylic amides, alkyl vinyl ethers such as methyl vinyl ether, ethyl vinyl ether, etc., vinyl esters such as vinyl formate, vinyl acetate, vinyl propionate, vinyl pivalate, vinyl versatate, etc, and vinyl alcohols obtained by saponification of vinyl esters with basic compounds, or the like, 2-hydroxyethyl acrylate, glycidyl (meth)acrylate, (meth)acrylonitrile, styrene, substituted styrene, vinyl halides, vinylidene halides, carbon monoxide, sulfur dioxide, etc., or a combination thereof. Particularly, ethylene and α-olefin having 4-10 carbon atoms are preferred and copolymers of two or more of them may be used.

A polypropylene resin composition for coating is provided by acid modification of the above-defined resins (A), (B) and (C) based on a difference in physical properties thereof and characteristics thereof to optimize the resin composition, and thus the provided polypropylene resin composition has excellent adhesive property and spraying property, shows no tagging, and has a high crystallization rate.

Herein, resins (A), (B) and (C) has a polydispersity (Mw/Mn) of 5 or less, preferably 4 or less, as determined by gel permeation chromatography (GPC). When the polydispersity (Mw/Mn) is higher than 5, non-homogeneous property of the resins may cause generation of defects in coated bodies, occlusion of a spray gun and degradation of coating stability.

To impart coatability to a polypropylene substrate by applying such modified polypropylene resins thereto, it is essentially required for the coating resins to have an isotactic chain molar fraction L capable of forming crystals. Now, parameters, by which polypropylene resins applicable as coating resins are expressed clearly, are established as shown in Mathematical Formula 1 from an isotactic chain length that may have crystallinity that is not represented by a monomer chain fraction [mmmm].

In Mathematical Formula 1, the isotactic chain molar fraction, L, is obtained by using a polymer melting point determined by differential scanning calorimetry (DSC). In addition, according to [T. M. Madkuor, J. E. Mark, Macromol. Theory Simul., 7, 69 (1998)], the melting point of a perfect crystal, $T_m^0$, and enthalpy per mol % of crystallizable units, $\Delta H_u$ are taken as 461K and 8.79 kJ/mol, respectively.

When the composition has a heterogeneous monomer content of 20 mol % or higher, or an isotactic chain molar fraction, L, of 0.30 or less, spraying property is satisfactory but it is not possible to expect sufficient quality due to low adhesion and generation of tagging. Polypropylene resins are used because the polypropylene used as a substrate is a polymer in which the isotactic chain molar fraction, L, in Mathematical Formula 1 is nearly 1, and thus shows poor compatibility with resins other than a polypropylene resin having a high propylene content.

It is known that the adhesion mechanism between a polypropylene substrate and a coating agent using polypropylene resins is formation of cocrystals (anchor lamellae) between a substrate surface and a coating agent, generated by heat treatment after coating, erosion of the substrate surface caused by a solvent, or the like. A relatively high isotactic chain molar fraction, L, leads to improved adhesion to a polypropylene substrate but poor dissolution characteristics. On the other hand, a relatively small isotactic chain molar fraction, L, leads to high dissolution characteristics but poor adhesion and poor coating properties such as tagging property and scratch resistance.

According to Japanese Laid-Open Patent No. 2003-41074, it is said that blending high-molecular weight stereoblock polypropylene having an isotactic chain molar fraction, L, of 0.76 or more with waste polypropylene having an L value of about 1 results in improvement of mechanical properties of the resultant blend. This is based on compatibility between the stereoblock polypropylene and waste polypropylene. In other words, it is thought that the isotactic chains of the two polymers form cocrystals to increase the long period of lamellae. A propylene resin having an L value of 0.76 or more is not dissolved well in an aliphatic solvent having a boiling point of 100° C. or less or has poor stability at room temperature, and thus is not suitable as a resin for coating.

Such a resin composition has adhesion to a polypropylene material but may not realize dispersion of coating or adhesion to a polar material due to its non-polarity. Therefore, it is required to provide the resin composition with polarity. The following two types of methods have been used conventionally to impart polarity to an olefin resin.

First, an unsaturated compound containing a carboxyl or acid anhydride group in its molecule and the above-mentioned radical initiator are added to an olefin resin under agitation individually to carry out modification.

Second, an organic solvent is added to and dispersed in an olefin polymer so that the polymer is dissolved therein, and an unsaturated compound containing a carboxyl or acid anhydride group in its molecule and the above-mentioned radical initiator are added to carry out modification.

The first method causes non-homogeneous acid modification, a large amount of impurities due to an irregular reaction or crosslinking reaction resulting from a high-temperature reaction, and excessive coloring and malodor. Thus, it is not suitable for coating. The acid modification of polypropylene resins according to the present disclosure uses the second method including a homogeneous reaction and utilizing an organic solvent that allows easy removal of unreacted materials.

The unsaturated carboxylic acid unit is introduced by an unsaturated carboxylic acid or anhydride thereof. Particular examples of such acid include acrylic acid, methacrylic acid, maleic acid, maleic anhydride, itaconic acid, itaconic anhydride, aconitic acid, aconitic anhydride, fumaric acid, crotonic acid, citraconic acid, mesaconic acid, allylsuccinic acid, etc., as well as a compound having at least one carboxyl group or acid anhydride group in its molecule (monomer unit), such as half-ester or half-amide of unsaturated dicarboxylic acid. Particularly, maleic anhydride, acrylic acid or methacrylic acid is preferred in view of easy introduction to a polyolefin resin.

The unsaturated carboxylic acid unit may be copolymerized in a polypropylene resin and there is no limitation in particular type of copolymerization. For example, the copolymerization may be random copolymerization, block copolymerization, graft copolymerization, etc. The acid anhydride unit introduced to a polypropylene resin tends to take an acid anhydride structure in a dry state. In addition, in an aqueous medium containing a basic compound as described hereinafter, the acid anhydride unit tends to take the structure of a carboxylic acid or a salt thereof by undergoing partial or total ring-opening.

There is no particular limitation in the method for introducing an unsaturated carboxylic acid unit to a polypropylene resin. Particular examples of the method for introducing an unsaturated carboxylic acid unit to a polypropylene resin includes graft copolymerization of an unsaturated carboxylic acid unit to a propylene resin by heating and melting a polypropylene resin and an unsaturated carboxylic acid to a temperature above the melting point of the polypropylene resin in the presence of a radical initiator to carry out reaction, by dissolving a polypropylene resin into an organic solvent and heating and agitating the mixture in the presence of a radical generator to carry out reaction, or the like.

The unsaturated compound containing a carboxyl group or acid anhydride group in its molecule may be used in an amount of 1-20 parts by weight, preferably 2-15 parts by weight based on 100 parts by weight of a polypropylene resin.

Particular examples of the radical initiator include but are not limited to: peroxyketal di-tert-butylperoxides, such as 1,1-bis(tert-butylperoxy)-3,5,5-trimethylcyclohexane, 1,1-bis(tert-butyl peroxy)cyclohexane, 2,2-bis(tert-butylperoxy)

octane, n-butyl-4,4-bis(tert-butylperoxy)valeate and 2,2-bis(tert-butylperoxy)butane; dialkyl peroxides, such as dicumyl peroxide, tert-butylcumyl peroxide, a,a-bis(tert-butylperoxy-m-isopropyl)benzene, 2,5-dimethyl-2,5-bis(tert-butylperoxy)hexane and 2,5-dimethyl-2,5-bis(tert-butylperoxy-hexyne-3); diacyl peroxides, such as acetyl peroxide, isobutyl peroxide, octanoyl peroxide, lauroyl peroxide, 3,5,5-trimethylhexanoyl peroxide, benzoyl peroxide, 2,4-dichlorobenzoyl peroxide and m-toluoyl peroxide; peroxy esters, such as tert-butyl peroxyacetate, tert-butyl peroxyisobutyrate, tert-butyl peroxy-2-ethyl hexanoate, tert-butyl peroxylaurate, tert-butyl peroxybenzoate, di-tert-butyl peroxyisophthalate, 2,5-dimethyl-2,5-di(benzoylperoxy)hexane, tert-butyl peroxymaleate, tert-butyl peroxyisopropylcarbonate and cumyl peroxyoctate; and hydroperoxides, such as tert-butyl hydroperoxide, diisopropylbenzene hydroperoxide, 2,5-dimethyl hexane-2,5-dihydroperoxide and 1,1,3,3-tetramethylbutyl hydroperoxide. In addition, the above-listed radical initiators may be used alone or in combination. The radical initiator is used in an amount of 5-50 parts by weight, preferably 10-30 parts by weight based on 100 parts by weight of the carboxyl groups or anhydride groups.

The resin composition for coating may be dispersed in water or a suitable organic solvent as a dispersion solvent so that it may be used as a coating agent. Preferably, the dispersion solvent is a basic material.

Particular examples of the organic solvent that may be used include: alcohols, such as methanol, ethanol, n-propanol, isopropanol, n-butanol, isobutanol, sec-butanol, tert-butanol, n-amyl alcohol, isoamyl alcohol, sec-amyl alcohol, tert-amyl alcohol, 1-ethl-1-propanol, 2-methyl-1-butanol, n-hexanol and cyclohexanol; ketones, such as methyl ethyl ketone, methyl isobutyl ketone, ethyl butyl ketone and cyclohexanone; aromatic hydrocarbons, such as benzene, toluene, xylene, cumene and cymene; alicyclic hydrocarbons, such as cyclopentane, cyclohexane, cyclooctane, methylcyclohexane and methylcyclopentane; ethers, such as tetrahydrofuran and dioxane; esters, such as ethyl acetate, n-propyl acetate, isopropyl acetate, n-butyl acetate, isobutyl acetate, sec-butyl acetate, 3-methoxybutyl acetate, methyl propionate, ethyl propionate, diethyl carbonate and dimethyl carbonate; glycol derivatives, such as ethylene glycol monomethyl ether, ethylene glycol monoethyl ether, ethylene glycol monopropyl ether, ethylene glycol monobutyl ether and ethylene glycol ether acetate; 1-methoxy-2-propanol, 1-ethyoxy-2-propanol, 3-methoxy-3-methyl-1-butanol, methoxybutanol, acetonitrile, dimethyl formamide, dimethyl acetamide, diacetone alcohol, ethyl acetoacetate, 1,2-dimethyl glycerin, 1,3-dimethyl glycerin, trimethyl glycerin, or the like. The above-listed solvents may be used in combination.

Among such organic solvents, preferred solvents in view of a high effect of accelerating hydration of a resin include ethanol, n-propanol, isopropanol, n-butanol, methyl ethyl ketone, cyclohexanone, tetrahydrofuran, dioxane, ethylene glycol monoethyl ether, ethylene glycol monopropyl ether, ethylene glycol monobutyl ether, diethylene glycol monomethyl ether. More preferred solvents are organic solvents having one hydroxyl group per molecule. Particularly, ethylene glycol alkyl ethers are preferred since they are capable of hydrating a resin even in a small amount of addition.

The resin composition for coating according to the present disclosure may further include a surfactant, compound having a function of protective colloid, modified wax, acid-modified compound with a high acid number, water soluble polymer, polyol, or the like. If necessary, the resin composition for coating according to the present disclosure may further include various additives, such as a curing agent, leveling agent, defoaming agent, anti-popping agent, pigment dispersant, UV absorbing agent, thickening agent, anti-weathering agent, flame retardant, or the like.

Particular examples of the surfactant include cationic surfactants, anionic surfactants, nonionic surfactants, amphoteric surfactants, fluorine-containing surfactants and reactive surfactants.

Particular examples of the cationic surfactant include quaternary ammonium compounds obtained from a reactive group selected from an aliphatic group having 1 to about 22 aliphatic groups, or aromatic alkoxy wherein the alkyl chain has 1 to about 22 carbon atoms, polyoxyalkylene, alkylamido, hydroxyalkyl, aryl or alkylaryl group and a salt-forming anion selected from halogen, acetate, citrate, lactate, glycolate, phosphate, nitrate, sulfate and alkylsulfate. Such aliphatic groups may further include, in addition to carbon and hydrogen atoms, ether bonds, ester bonds and other groups, such as amino groups.

Particular examples of the anionic surfactant include sulfates of higher alcohols, higher alkylsulfonates and salts thereof, higher carboxylic acids, such as oleic acid, stearic acid and palmitic acid and salts thereof, alkylbenzenesulfonic acids and salts thereof, polyoxyethylene alkylsulfate salts, polyoxyethylene alkyl phenyl ether sulfate salts, vinyl sulfosuccinate, or the like.

Particular examples of the nonionic surfactant include compounds having a polyoxyethylene structure, such as polyoxyethylene alkyl ether, polyoxyethylene alkyl phenyl ether, polyethylene glycol fatty acid ester, ethylene oxide propylene oxide block copolymer, polyoxyethylene fatty acid amide, ethylene oxide-propylene oxide copolymer, etc., sorbitan derivatives, such as polyoxyethylene sorbitan fatty acid ester, or the like.

Particular examples of the amphoteric surfactant include lauryl betain, lauryl dimethylamine oxide, or the like. Particular examples of the reactive surfactant include compounds having a reactive double bond, such as alkylpropenylphenol polyethylene oxide adducts or sulfate esters thereof, allylalkylphenol polyethylene oxide adducts or sulfate esters thereof, allyldialkylphenol polyethylene oxide adducts or sulfate esters thereof, or the like.

The resin composition for coating according to the present disclosure may be used to form a coating agent, which, in turn, may be applied to a polypropylene substrate to form a laminate. The coating agent according to the present disclosure is amenable to spray coating while avoiding a need for a complicated process, such as discharge treatment, flame treatment or acid treatment of a polypropylene substrate, in the absence of chlorine.

There is no particular limitation in the method for applying the coating agent to a substrate. For example, gravure roll coating, reverse roll coating, wire bar coating, lip coating, air knife coating, curtain flow coating, spray coating, dip coating or brush coating processes may be used. In addition, particular examples of printing methods include gravure printing, stencil printing, screen printing, offset printing, flexographic printing, heat transfer printing, ink jet printing, scratch printing, prethrow printing, pad printing, form printing, label printing, or the like.

The coating agent according to the present disclosure may be applied in an adequately controlled amount. To control the coating amount, the system or operating condition thereof may be selected adequately. In addition to this, the coating amount may be controlled to have a concentration or viscosity suitable for a particularly intended coating film thickness.

The coating agent according to the present disclosure may be dried by any methods without particular limitation. For example, the drying may be carried out at a broad range of temperatures of 0-250° C. When a substrate has insufficient heat resistance, drying at 0-200° C. is more practical. In addition, the drying time depends on drying temperature and coating film thickness. As a non-limiting example, the drying time may range from 5 seconds to 120 minutes. A drying temperature of 50-150° C. and a drying time of 5 seconds to 3 minutes provide a high-quality coating film. In a variant, drying at room temperature for 30-120 minutes provides a high-quality coating film. Thus, the coating agent according to the present disclosure is capable of forming a high-quality coating film (laminate) even at a relatively low temperature.

In still another aspect, there are provided a laminate using the coating agent according to the present disclosure and a molded article obtained by using the coating composition. It is possible to provide a polypropylene-based laminate and molded article that shows excellent scratch resistance and adhesive property and has no tagging property by using the coating agent according to the present disclosure.

The examples and experiments will now be described. The following examples and experiments are for illustrative purposes only and not intended to limit the scope of the present disclosure.

EXAMPLE

Preparation of Polypropylene-Based Resin

The polypropylene-based resin used in this Example is polymerized as follows. As a polymerization catalyst for preparing polypropylene-based resins having different molecular weights, three types of homogeneous/non-homogeneous catalysts are used. As non-homogeneous catalysts, used are $TiCl_3/AlEt_2Cl$ (E. Albizzati, Macromol. Symp. 89. 73 (1995)) and a chrome-based catalyst used by Shin et al. to determine physical properties of a polypropylene-based resin as exemplified hereinafter. "Stepwise polymerization of propylene and ethylene with $Cr(acethylacetonate)_3/MgCl_2$-ethylbenzoate/diethyl aluminum chloride catalyst system" Yong-Woo Shin, Hisayuki Nakatani, Toshiya Uozumi, Boping Liu, Tsuneji Sano, Koh-hei Nitta, Minoru Terano, Polymer Inter International, 2003, 52, 29-34.

Preparation of a metallocene-based catalyst is based on the method of Waymouth, et al. (G. Coates and R. M. Waymouth, Science, 267, 217 (1995), E. Hauptman, R. M. Waymouth and W. J. Ziller, L. Am. Chem. Soc., 117, 11586 (1995), M. D. Bruce, G. W. Caotes, E. Hauptman, R. M. Waymouth and J. W. Ziller, J. Am. Chem. Soc., 119, 11174 (1997)). Particularly, bis(2-phenylindenyl)-zirconium dichloride and bis(2-(bis-3,5-trifluoromethylphenyl)indenyl)-zirconium dichloride are prepared.

Different polypropylene resins are prepared by using the catalysts while introducing hydrogen to control molecular weight or while varying polymerization conditions by adjusting polymerization temperatures or monomer concentrations.

To carry out polymerization, 0.4-1 L of toluene and organoaluminum (available from Tosoku) are added to a 3 L autoclave purged with nitrogen at room temperature (25° C.). To perform polymerization of low-molecular weight polypropylene, hydrogen is added and then a predetermined amount of propylene gas is introduced. In the case of copolymerization, a heterogeneous monomer is further added thereto. Then, a desired catalyst/external donor-toluene solution is added and the mixed solution is heated to a predetermined temperature to carry out reaction. After the lapse of a reaction time of 1-6 hours, ethanol is introduced to quench the polymerization. The reaction mixture is introduced into ethanol-hydrochloric acid solution to precipitate the resultant polymer. Then, the solvent is separated from the resin, and the obtained resin is dried in a depressurized drier for 7 hours to obtain a polypropylene resin. Each polypropylene resin is shown in the following Table 1.

TABLE 1

| Run | Monomer | Catalyst | Polymerization temperature (° C.) | Hydrogen (MPa) |
|---|---|---|---|---|
| 1 | P | Cr | 90 | 0.1 |
| 2 | P | Cr | 70 | 0.05 |
| 3 | P | Cr | 70 | 0.01 |
| 4 | P + E | Cr | 70 | — |
| 5 | P + E | Cr | 70 | 0.03 |
| 6 | P + B | Cr | 70 | — |
| 7 | P + B | Cr | 70 | 0.03 |
| 8 | P | Zr | 40 | — |
| 9 | P | Zr | 40 | 0.05 |
| 10 | P | Zr | 40 | 0.1 |
| 11 | P + E | Zr | 40 | — |
| 12 | P + E | Zr | 40 | 0.03 |
| 13 | P + B | Zr | 40 | — |
| 14 | P + B | Zr | 40 | 0.03 |
| 15 | P | Ti | 40 | 0.15 |
| 16 | P | Ti | 40 | — |

Monomer: P = propylene, E = Ethylene, B = 1-Butene.

Next, significance of index L according to the present disclosure will be explained by comparing a mesopentad fraction with an isotactic chain molar fraction L in a polypropylene resin.

For different types of polypropylene resins having different stereoregularities, molecular weights and melt flow rates according to the present disclosure, the results of comparison of their mesopentad fractions [mmmm] with isotactic chain molar fractions L are shown in the following Table 2.

Molecular weights and molecular weight distributions are determined by using SSC-7700 HT-GPC (available from Senshu Scientific Co. Ltd.) and determination is carried out by using o-dichlorobenzene as a solvent and polystyrene standards at 140° C.

Isotactic chain molar fraction L is determined by using DSC820 (produced by Mettler Co.) and determination is carried out in a range of 20-220° C. at a heating rate of 20° C./min, followed by calculation from the measured values.

In addition, mesopentad fraction [mmmm] of polypropylene is obtained from 9 separated peaks of methyl carbon regions determined by $^{13}C$-NMR. The peaks are assigned based on the method described in V. Busico, P. Corradini, R. D. Biasio, L. Landeiani, A. L. Maro, Vol. 27, 4521-4524 (1994).

TABLE 2

| Run | Mw/10$^4$ | Mw/Mn | L | [mmmm]% |
|---|---|---|---|---|
| 1 | 1.5 | 2.3 | 0.72 | 49 |
| 2 | 4.5 | 2.6 | 0.71 | 55 |
| 3 | 4.6 | 2.1 | 0.77 | 52 |
| 4 | 23 | 3.1 | 0.57 | 44 |
| 5 | 3.5 | 3.3 | 0.42 | 52 |
| 6 | 18 | 3.0 | 0.47 | 52 |
| 7 | 3.3 | 3.7 | 0.45 | 62 |
| 8 | 36 | 2.8 | 0.66 | 55 |
| 9 | 22 | 2.9 | 0.34 | 49 |
| 10 | 3.3 | 2.9 | 0.27 | 52 |
| 11 | 24 | 3.6 | 0.43 | 32 |
| 12 | 4.3 | 3.3 | 0.55 | 39 |
| 13 | 21 | 3.1 | 0.66 | 41 |
| 14 | 3.6 | 3.2 | 0.54 | 44 |
| 15 | 0.9 | 3.6 | 0.73 | 66 |
| 16 | 12 | 3.8 | 0.72 | 58 |

In Table 2, it appears that an isotactic chain molar fraction tends to increase in proportion to a mesopentad fraction [mmmm] but there is an exception. For example, Run 2 shows a mesopentad fraction of 55 and L of 0.71, while Run 3 shows a mesopentad fraction of 52 and L of 0.74. It can be seen that Run 2 shows a higher mesopentad fraction but lower L as compared to Run 3. In addition, Run 6 shows a mesopentad fraction of 52 and L of 0.47, while Run 7 shows a mesopentad fraction of 62, which is 10% higher than Run 6. However, Run 7 shows an L value of 0.45, which is lower than Run 6.

Modification of Polymerized Polypropylene Resin with Maleic Anhydride

To a 3 L stainless steel reactor equipped with a thermometer and a stirring bar and containing 500 g of xylene, 100 g of each copolymer of Table 1 is introduced and heated to 140° C. so that it is dissolved in xylene. Next, 15 g of maleic anhydride and 10 g (10 wt %) of solution of benzoyl peroxide in toluene is added dropwise gradually thereto over 3 hours, and then the reaction mixture is subjected to reaction for 3 hours. After the completion of the reaction, the reaction mixture is added dropwise to 2 L of acetone to perform crystallization, followed by washing and drying three time, to obtain an acid-modified polypropylene resin.

The acid number of the acid-modified resin is determined by using Nicolet iS10 FT-IR Spectrometer through a permeation process. The process includes using Michelson Interferometer to obtain Interferogram which is a time-dependent spectrum, and then subjecting Interferogram to Fourier transformation to obtain a frequency-dependent spectrum. Since FT-IR has significant advantages in terms of time and sensitivity required to obtain a spectrum as compared to Dispersive IR according to the related art, it serves to supplement other spectrometric methods, such as NMR.

After determining each spectrum (Scans: 32, resolution 4 cm$^{-1}$), a peak derived from carbonyl group of maleic acid and a peak derived from CH$_3$ group of polypropylene are detected at 1785 cm$^{-1}$ and 1167 cm$^{-1}$, respectively.

After calculating the area of each of the two peaks, CI (Carbonyl Index) corresponding to a maleic acid modification ratio is obtained by using the following formula. In addition, in the case of acid-modified polyethylene, a peak derived from carbonyl group of maleic acid and a peak derived from CH$_3$ group of polypropylene are detected at 1783 cm$^{-1}$ and 1378 cm$^{-1}$, respectively. Then, the following formula is used to calculate an acid modification ratio with reference to related documents.

Acid-Modified Polypropylene Resin $$CI(\text{Carbonyl Index}) = \left(\frac{A_{1785}}{A_{1167}}\right)$$

wherein $A_{1755}$ is the peak area of carbonyl in maleic acid, and $A_{1167}$ is the peak area of CH$_3$ in polypropylene.

The result for each acid-modified resin is shown in the following Table 3.

TABLE 3

| Run | C.I | Component |
|---|---|---|
| 1 | 2.8 | C-1 |
| 2 | 2.6 | C-2 |
| 3 | 2.4 | C-3(Comp.) |
| 4 | 2.9 | A-1 |
| 5 | 1.6 | B-1 |
| 6 | 2.2 | A-2 |
| 7 | 1.8 | B-2 |
| 8 | 3.3 | A-3(Comp.) |
| 9 | 3.1 | B-3 |
| 10 | 1.7 | B-4(Comp.) |
| 11 | 2.6 | A-4 |
| 12 | 2.1 | B-5 |
| 13 | 2.7 | A-5 |
| 14 | 1.6 | B-6 |
| 15 | 1.2 | C-4 |
| 16 | 2.6 | C-5(Comp.) |

In Table 3, as can be seen from Table 2, Run 3 shows an excessively high isotactic chain molar fraction L of 0.77, Run 8 shows an excessively high molecular weight of 360,000, Run 10 shows an excessively Low L of 0.27, and Run 16 shows an excessively high molecular weight of 120,000. Thus, Run 3, Run 8, Run 10 and Run 16 represent Comparative Examples.

Example 1

To a four-necked flask equipped with a stirrer and a thermometer, 56 g of a mixed solvent of methyl cyclohexane: methyl ethyl ketone (9:1) is introduced. Next, 5.0 g of component A-1 resin, 4.7 g of B-1 resin and 0.3 g of C-1 resin (see Table 3) are introduced and dissolved at 70° C. for 4 hours. Then, the mixture is cooled to room temperature to obtain a high-viscosity resin dispersion for coating. The resin dispersion for coating is diluted with a mixed solvent of hexane: methyl ethyl ketone (9:1) so that a melt flow rate determined by Ford Cup No. 4 at 25° C. becomes 13±1 seconds. In this manner, a resin composition for coating is obtained.

Example 2

Example 1 is repeated, except that 5.5 g of resin A-2, 4.8 g of resin B-2 and 0.2 g of resin C-2 (see Table 3) are used to obtain a resin composition for coating.

Example 3

Example 1 is repeated, except that 6.5 g of resin A-4, 3.1 g of resin B-1 and 0.4 g of resin C-4 (see Table 3) are used to obtain a resin composition for coating.

Example 4

Example 1 is repeated, except that 4.4 g of resin A-5, 5.5 g of resin B-5 and 0.1 g of resin C-2 (see Table 3) are used to obtain a resin composition for coating.

Example 5

Example 1 is repeated, except that 5.5 g of resin A-1, 4.4 g of resin B-6 and 0.1 g of resin C-2 (see Table 3) are used to obtain a resin composition for coating.

Example 6

Example 1 is repeated, except that 3.6 g of resin A-5, 6.0 g of resin B-2 and 0.4 g of resin C-1 (see Table 3) are used to obtain a resin composition for coating.

Example 7

Example 1 is repeated, except that 4.5 g of resin A-4, 5.4 g of resin B-2 and 0.1 g of resin C-1 (see Table 3) are used to obtain a resin composition for coating.

Example 8

Example 1 is repeated, except that 5.4 g of resin A-1, 4.5 g of resin B-6 and 0.1 g of resin C-4 (see Table 3) are used to obtain a resin composition for coating.

The following Table 4 shows the ingredients and composition of each resin according to Examples 1 to 8.

TABLE 4

| | Ingredients | Composition (wt %) |
|---|---|---|
| Ex. 1 | A-1 | 50 |
| | B-1 | 47 |
| | C-1 | 3 |
| Ex. 2 | A-2 | 55 |
| | B-2 | 48 |
| | C-2 | 2 |
| Ex. 3 | A-4 | 65 |
| | B-1 | 31 |
| | C-4 | 4 |
| Ex. 4 | A-5 | 44 |
| | B-5 | 55 |
| | C-2 | 1 |
| Ex. 5 | A-1 | 55 |
| | B-6 | 44 |
| | C-2 | 1 |
| Ex. 6 | A-5 | 36 |
| | B-2 | 60 |
| | C-1 | 4 |
| Ex. 7 | A-4 | 45 |
| | B-2 | 54 |
| | C-1 | 1 |
| Ex. 8 | A-1 | 54 |
| | B-6 | 45 |
| | C-4 | 1 |

Comparative Example 1

Example 1 is repeated, except that 10 g of resin A-1 (see Table 3) is used alone to obtain a resin composition for coating.

Comparative Example 2

Example 1 is repeated, except that 10 g of resin B-1 (see Table 3) is used alone to obtain a resin composition for coating.

Comparative Example 3

Example 1 is repeated, except that 10 g of resin C-1 (see Table 3) is used alone to obtain a resin composition for coating.

Comparative Example 4

Example 1 is repeated, except that 5 g of resin A-2 and 5 g of resin B-2 (see Table 3) are used to obtain a resin composition for coating.

Comparative Example 5

Example 1 is repeated, except that 9.5 g of resin A-3 (comparative) and 0.5 g of resin C-2 (see Table 3) are used to obtain a resin composition for coating.

Comparative Example 6

Example 1 is repeated, except that 9.5 g of resin B-6 and 0.5 g of resin C-4 (see Table 3) are used to obtain a resin composition for coating.

Comparative Example 7

Example 1 is repeated, except that 5 g of resin A-1, 4.7 g of resin B-1 and 0.3 g of resin C-3 (comparative) (see Table 3) are used to obtain a resin composition for coating.

Comparative Example 8

Example 1 is repeated, except that 5 g of resin A-1, 4.7 g of resin B-4 (comparative) and 0.3 g of resin C-1 (see Table 3) are used to obtain a resin composition for coating.

Comparative Example 9

Example 1 is repeated, except that 5 g of resin A-3 (comparative), 4.7 g of resin B-2 and 0.3 g of resin C-1 (see Table 3) are used to obtain a resin composition for coating.

Comparative Example 10

Example 1 is repeated, except that 5.5 g of resin A-2, 4.8 g of resin B-4 (comparative) and 0.2 g of resin C-3 (comparative) (see Table 3) are used to obtain a resin composition for coating.

Comparative Example 11

Example 1 is repeated, except that 5.4 g of resin A-3 (comparative), 4.5 g of resin B-4 (comparative) and 0.1 g of resin C-5 (comparative) (see Table 3) are used to obtain a resin composition for coating.

The following Table 5 shows the ingredients and composition of each resin according to Comparative Examples 1 to 11.

TABLE 5

| | Ingredients | Composition (wt %) |
|---|---|---|
| Comp. Ex. 1 | A-1 | 100 |
| Comp. Ex. 2 | B-1 | 100 |
| Comp. Ex. 3 | C-1 | 100 |
| Comp. Ex. 4 | A-2 | 50 |
| | B-2 | 50 |
| Comp. Ex. 5 | A-3(comparative) | 95 |
| | C-2 | 5 |
| Comp. Ex. 6 | B-6 | 95 |
| | C-4 | 5 |
| Comp. Ex. 7 | A-1 | 50 |
| | B-1 | 47 |
| | C-3(comparative) | 3 |
| Comp. Ex. 8 | A-1 | 50 |
| | B-4(comparative) | 47 |
| | C-1 | 3 |
| Comp. Ex. 9 | A-3(comparative) | 50 |
| | B-2 | 47 |
| | C-1 | 3 |
| Comp. Ex. 10 | A-2 | 55 |
| | B-4(comparative) | 48 |
| | C-3(comparative) | 2 |
| Comp. Ex. 11 | A-3(comparative) | 54 |
| | B-4(comparative) | 45 |
| | C-5(comparative) | 1 |

Evaluation and Results
Evaluation of Stability of Resin Composition for Coating
First, 30 g of each resin composition for coating according to Examples 1-8 and Comparative Examples 1-11 is introduced into a clear glass bottle, and is allowed to stand for 10 days at 5° C. and 40° C. each to evaluate the state of solution. After 10 days, each solution of resin composition is further allowed to stand for 24 hours. Then, when a solution has a Ford Cup index of less than 13±3 seconds, shows no deposit on the glass wall surface and is clear, it is designated as 'good'. However, when a solution has a Ford Cup index of 13±3 or higher, it is designated as 'thickened'. In addition, when a solution is opaque or shows deposit on the glass wall surface, it is designated as 'defect generation'.

Evaluation of Spraying Property of Resin Composition for Coating
Each sample according to Examples 1-8 and Comparative Examples 1-11 is applied through Iwata Coater (W-101) under an atomization pressure of 4 kg/cm². When a sample is atomized and provides a uniform coating film, it is designated as '⊚'. However, when a sample is capable of atomization but provides a non-uniform coating film, it is designated as 'Δ'. In addition, when a sample is not capable of atomization, it is designated as 'X'.

Evaluation of Scratch Resistance of Coating Film
A rectangular plate of polypropylene (6×10 cm) is cleaned on the surface thereof with isopropyl alcohol, and then each coating agent according to Examples 1-8 and Comparative Examples 1-11 is applied to a dry coating film thickness of 12 μm, followed by drying at 80° C. for 20 minutes. After allowing the dried coated body to stand at room temperature for 24 hours, the coating film is scratched with water and sand (50/50) and the coating film is evaluated for its condition and gloss maintenance. When a coating film shows a gloss maintenance of 80 or higher, it is designated as '⊚'; a gloss maintenance equal to or higher than 70 and less than 80 as '○'; a gloss maintenance equal to or higher than 60 and less than 70 as 'Δ'; and a gloss maintenance less than 60 as 'X'.

Evaluation of Adhesion of Coating Film
A rectangular plate of polypropylene (6×10 cm) is cleaned on the surface thereof with isopropyl alcohol, and then each coating agent according to Examples 1-8 and Comparative Examples 1-11 is applied to a dry coating film thickness of 12 μm, followed by drying at 80° C. for 20 minutes. After allowing the dried coated body to stand at room temperature for 1 hour and 24 hours, 100 cross-cuts with a size of 1×1 mm are prepared to perform a cellophane tape peel test. When a sample shows no peeling in its cross-cuts, it is designated as '⊚'; peeling in less than 5/100 cross-cuts as '○'; peeling in equal to or higher than 5/100 and less than 10/100 cross-cuts as 'Δ'; and peeling in equal to or higher than 10/100 cross-cuts as 'X'.

Evaluation of Tagging Property of Coating Film
A rectangular plate of polypropylene (6×10 cm) is cleaned on the surface thereof with isopropyl alcohol, and then each coating agent according to Examples 1-8 and Comparative Examples 1-11 is applied to a dry coating film thickness of 12 μm, followed by drying at 80° C. for 20 minutes. After allowing the dried coated body to stand at room temperature for 1 hour, an OPP film (12×20 cm) is placed on the coated body, and an iron plate (12×20 cm) with a weight of 2 kg is placed on the top of the OPP film. After the iron plate is allowed to stand for 30 minutes, it is lifted at 90°. Under these conditions, when the underlying OPP film is lifted along with the iron plate, the corresponding sample is designated as '⊚'. When a coated body shows no movement while the OPP film is moved, the corresponding sample is designated as '○'. In addition, when a coated body is moved or is not separated from the OPP film, the corresponding sample is designated as 'X'.

Evaluation of Water Resistance of Coating Film
A rectangular plate of polypropylene (6×10 cm) is cleaned on the surface thereof with isopropyl alcohol, and then each coating agent according to Examples 1-8 and Comparative Examples 1-11 is applied to a dry coating film thickness of 12 μm, followed by drying at 80° C. for 20 minutes. After allowing the dried coated body to stand at room temperature for 24 hours, it is dipped in water at 40° C. for 10 days. When a coating film causes no blisters, it is designated as '⊚'; 5 or less blisters in an area of 5×5 cm as '○'; 20 or less blisters as 'Δ'; and 20 or more blisters as 'X'.

TABLE 6

| | Spraying Stability | Spraying Property | Scratch Resistance | Adhesion 1 h | Adhesion 24 h | Tagging Property | Water Resistance |
|---|---|---|---|---|---|---|---|
| Ex. 1 | Good | ⊚ | ○ | ○ | ⊚ | ⊚ | ⊚ |
| Ex. 2 | Good | ⊚ | ○ | ○ | ⊚ | ⊚ | ⊚ |
| Ex. 3 | Good | ⊚ | ○ | ○ | ⊚ | ⊚ | ⊚ |
| Ex. 4 | Good | ⊚ | ○ | ○ | ⊚ | ⊚ | ⊚ |
| Ex. 5 | Good | ⊚ | ○ | ○ | ⊚ | ⊚ | ⊚ |
| Ex. 6 | Good | ⊚ | ○ | ○ | ⊚ | ⊚ | ⊚ |
| Ex. 7 | Good | ⊚ | ○ | ○ | ⊚ | ⊚ | ⊚ |
| Ex. 8 | Good | ⊚ | ○ | ○ | ⊚ | ⊚ | ⊚ |
| Comp. Ex. 1 | Thickened | X | Δ | Δ | ⊚ | ⊚ | ⊚ |
| Comp. Ex. 2 | Good | ⊚ | X | X | X | X | X |
| Comp. Ex. 3 | Defect generation | ⊚ | ○ | X | Δ | ⊚ | X |
| Comp. Ex. 4 | Good | ⊚ | Δ | X | Δ | ○ | X |
| Comp. Ex. 5 | Thickened | X | ⊚ | ⊚ | ⊚ | ○ | ○ |
| Comp. Ex. 6 | Good | ○ | Δ | Δ | ○ | X | ○ |
| Comp. Ex. 7 | Defect generation | X | ⊚ | ○ | ⊚ | ⊚ | ⊚ |
| Comp. Ex. 8 | Good | ⊚ | X | X | ⊚ | X | Δ |
| Comp. Ex. 9 | Thickened | X | ⊚ | ⊚ | ⊚ | ⊚ | ⊚ |
| Comp. Ex. 10 | Defect generation | X | X | X | X | X | X |
| Comp. Ex. 11 | Defect generation (Thickened) | X | X | X | X | X | X |

Referring to Table 6, the resin compositions of Examples 1-8 according to the present disclosure provide high stability and excellent spraying property. In addition, it is observed that a coating film obtained from each resin composition shows excellent scratch resistance, adhesion, tagging property and water resistance.

Comparative Example 1 using a high-molecular weight resin alone is not capable of atomization and provides a non-uniform coating film. It also causes thickening in a high-temperature storage test. Comparative Example 2 using a low-molecular weight resin alone shows excellent solution stability and spraying property but provides a coating film with poor physical properties.

Comparative Example 3 using a low-molecular weight highly crystalline resin alone causes a large amount of defect generation in a low-temperature storage test and provides a non-uniform coating film, resulting in degradation of adhesion. Comparative Example 4 free from a low-molecular weight highly crystalline resin shows a delay in crystallization rate of a coating film, resulting in degradation of adhesion and water resistance.

Comparative Example 5 using ingredient A having an excessively high molecular weight causes degradation of spraying property. Comparative Example 6 free from a high-molecular weight resin (ingredient A) causes degradation of tagging property. Comparative Example 7 using ingredient C having an excessively high isotactic chain molar fraction L of 0.77 causes a large amount of defect generation and degradation of spraying property, resulting in a non-uniform coating film.

Comparative Example 8 uses the same amount of ingredient A and ingredient C as Example 1, but includes ingredient B having an excessively low molar fraction L of 0.27. Thus, it causes degradation of tagging property and scratch resistance. Comparative Example 9 is problematic in terms of stability and spraying property, like Comparative Example 5. Comparative Example 10 using ingredient B having an excessively low molar fraction L and ingredient C having an excessively high molar fraction L is problematic in terms of all items as coating. Comparative Example 11 provides the same results as Comparative Example 10, and causes thickening of solution.

Therefore, it can be seen from the foregoing that the polypropylene resin composition for coating according to the present disclosure is amenable to spray coating while avoiding a need for a complicated process such as discharge treatment, flame treatment or acid treatment of a polypropylene substrate, in the absence of chlorine, and is effective for forming a coating film having excellent scratch resistance and adhesive property and showing no tagging property.

While the present disclosure has been described with respect to the specific embodiments, it will be apparent to those skilled in the art that various changes and modifications may be made without departing from the spirit and scope of the disclosure as defined in the following claims.

The invention claimed is:

1. A resin composition for coating, comprising:
35-65 wt % of a high-molecular weight polypropylene resin (A) having a weight average molecular weight of 100,000-300,000 and an isotactic chain molar fraction, L, as defined in the following Mathematical Formula 1, of 0.30-0.70;
30-60 wt % of a low-molecular weight polypropylene resin (B) having a weight average molecular weight of 10,000-50,000 and an isotactic chain molar fraction, L, as defined in the following Mathematical Formula 1, of 0.30-0.70; and
0.1-5.0 wt % of a highly crystalline, low-molecular weight polypropylene resin (C) having a weight average molecular weight of 5,000-50,000 and an isotactic chain molar fraction, L, as defined in the following Mathematical Formula 1, of 0.70-0.75

$$\frac{1}{T_m} - \frac{1}{T_m^0} = -\frac{R}{\Delta H_U} \ln L \quad \text{[Mathematical Formula 1]}$$

wherein $T_m$ is melting point of a resin, $T_m^0$ is melting point of a perfect crystal, R is the gas constant, $\Delta H_u$ is melting enthalpy per mol of crystallizable units, and L is an isotactic chain molar fraction.

2. The resin composition for coating according to claim 1, wherein the high-molecular weight polypropylene resin (A) has a polydispersity (Mw/Mn) of 5 or less.

3. The resin composition for coating according to claim 1, wherein each of the high-molecular weight polypropylene resin (A) and the low-molecular weight polypropylene resin (B) comprises structural units derived from a heterogeneous monomer in an amount less than 20 mol %.

4. The resin composition for coating according to claim 1, wherein the highly crystalline low-molecular weight polypropylene resin (C) comprises structural units derived from a heterogeneous monomer in an amount less than 5 mol %.

5. The resin composition for coating according to claim 3, wherein the heterogeneous monomer is at least one selected from ethylene, 1-butene, 1-pentene, 1-hexene, 1-methyl-1-pentene, 4-methyl-1-pentene, 1-heptene, 1-octene, 1-nonene, 1-decene and 1-dodecene.

6. The resin composition for coating according to claim 1, which further comprises water and a surfactant.

7. A coating agent comprising the resin composition for coating as defined in claim 1 and at least one dispersion solvent selected from water and an organic solvent.

8. The coating agent according to claim 7, wherein the dispersion solvent is a basic material.

9. A laminate obtained by stacking a layer comprising the resin composition for coating as defined in claim 1 on a substrate.

10. A coated molded article obtained by using the resin composition for coating as defined in claim 1.

11. A polypropylene resin having a weight average molecular weight of 100,000-300,000 and an isotactic chain molar fraction, L, as defined in the following Mathematical Formula 1, of 0.30-0.70, characterized by comprising structural units derived from a heterogeneous monomer:

$$\frac{1}{T_m} - \frac{1}{T_m^0} = -\frac{R}{\Delta H_U} \ln L \quad \text{[Mathematical Formula 1]}$$

wherein $T_m$ is melting point of a resin, $T_m^0$ is melting point of a perfect crystal, R is the gas constant, $\Delta H_u$ is melting enthalpy per mol of crystallizable units, and L is an isotactic chain molar fraction.

12. A polypropylene resin having a weight average molecular weight of 100,000-300,000 and an isotactic chain molar fraction, L, as defined in the following Mathematical Formula 1, of 0.30-0.70, characterized by comprising structural units derived from a heterogeneous monomer:

$$\frac{1}{T_m} - \frac{1}{T_m^0} = -\frac{R}{\Delta H_U} \ln L \quad \text{[Mathematical Formula 1]}$$

wherein $T_m$ is melting point of a resin, $T_m^0$ is melting point of a perfect crystal, R is the gas constant, $\Delta H_u$ is melting enthalpy per mol of crystallizable units, and L is an isotactic chain molar fraction, wherein the heterogeneous monomer is at least one selected from ethylene, 1-butene, 1-pentene, 1-hexene, 1-methyl-1-pentene, 4-methyl-1-pentene, 1-heptene, 1-octene, 1-nonene, 1-decene and 1-dodecene.

13. A polypropylene resin having a weight average molecular weight of 5,000-50,000 and an isotactic chain molar fraction, L, as defined in the following Mathematical Formula 1, of 0.70-0.75, characterized by comprising structural units derived from a heterogeneous monomer in an amount less than 5 mol %:

$$\frac{1}{T_m} - \frac{1}{T_m^0} = -\frac{R}{\Delta H_U} \ln L \qquad \text{[Mathematical Formula 1]}$$

wherein $T_m$ is melting point of a resin, $T_m^0$ is melting point of a perfect crystal, R is the gas constant, $\Delta H_u$ is melting enthalpy per mol of crystallizable units, and L is an isotactic chain molar fraction.

14. The polypropylene resin according to claim 13, wherein the heterogeneous monomer is at least one selected from ethylene, 1-butene, 1-pentene, 1-hexene, 1-methyl-1-pentene, 4-methyl-1-pentene, 1-heptene, 1-octene, 1-nonene, 1-decene and 1-dodecene.

15. The resin composition for coating according to claim 1, which further comprises an unsaturated compound comprising a carboxyl or acid anhydride group.

16. The resin composition for coating according to claim 15, wherein the unsaturated compound comprising a carboxyl or acid anhydride group is introduced by an unsaturated carboxylic acid or anhydride selected from the group consisting of acrylic acid, methacrylic acid, maleic acid, maleic anhydride, itaconic acid, itaconic anhydride, aconitic acid, aconitic anhydride, fumaric acid, crotonic acid, citraconic acid, mesaconic acid, and allylsuccinic acid.

17. The resin composition for coating according to claim 15, wherein the unsaturated compound comprising a carboxyl or acid anhydride group is used in an amount of 1-20 parts by weight based on 100 parts by weight of the polypropylene resins.

18. The resin composition for coating according to claim 15, which further comprises a radical initiator.

19. The resin composition for coating according to claim 18, wherein the radical initiator is at least one selected from the group consisting of peroxyketals, dialkyl peroxides, diacyl peroxides, peroxyesters and hydroperoxides.

20. The resin composition for coating according to claim 18, wherein the radical initiator is used in an amount of 5-50 parts by weight based on 100 parts by weight of carboxyl groups or anhydride groups contained in the propylene resins.

* * * * *